United States Patent [19]
Desjardins

[11] Patent Number: 5,297,934
[45] Date of Patent: Mar. 29, 1994

[54] COMPENSATION FOR KINEMATIC FORESHORTENING EFFECT IN PITCH CONTROL SYSTEM FOR ROTARY WING AIRCRAFT

[75] Inventor: Rene A. Desjardins, Newtown Square, Pa.

[73] Assignee: The Boeing Company, Seattle, Wash.

[21] Appl. No.: 739,499

[22] Filed: Aug. 2, 1991

[51] Int. Cl.$^5$ .............................................. B64C 27/78
[52] U.S. Cl. ................................... 416/163; 416/164; 416/168 R
[58] Field of Search ............... 416/120, 123, 130, 159, 416/163, 164, 168 R

[56] References Cited

U.S. PATENT DOCUMENTS

| | | | |
|---|---|---|---|
| 3,404,852 | 10/1968 | Sambell et al. | 416/168 R |
| 3,450,208 | 6/1969 | Barton | 416/130 |
| 3,506,219 | 4/1970 | Mouille et al. | 416/123 |
| 3,610,774 | 10/1971 | Mouille | 416/244 |
| 4,281,966 | 8/1981 | Duret et al. | 416/168 R |
| 4,545,733 | 10/1985 | Schwarz et al. | 416/168 R |
| 4,626,173 | 12/1986 | Mouille et al. | 416/168 R |
| 5,096,381 | 3/1992 | Svenning | 416/135 |

*Primary Examiner*—Edward K. Look
*Assistant Examiner*—James A. Larson
*Attorney, Agent, or Firm*—Jones, Tullar & Cooper

[57] ABSTRACT

A rotor for a rotary wing aircraft includes a rotor shaft driveably connected to a power source, a rotor hub connected to the rotor shaft, rotor arms inclined with respect to a plane perpendicular to the rotor axis and pitch shafts supported on each rotor arm. The rotor arms each support a pitch shaft for pivotable movement about a pitch axis. A pitch beam carries flexures, each connected to a pitch arm at a location offset laterally from the associated pitch axis. The flexures driveably connect the pitch arms to the pitch beam and transmit pitch control motion to the blades as the pitch beam moves along the rotor axis. Each flexure is intentionally displaced by bending radially during installation in a direction that reduces forces among components of the flexure bearings developed during operation.

11 Claims, 5 Drawing Sheets

FIG_6

COMPENSATION FOR KINEMATIC FORESHORTENING EFFECT IN PITCH CONTROL SYSTEM FOR ROTARY WING AIRCRAFT

CROSS-REFERENCE TO RELATED APPLICATIONS

This application discloses subject matter in common with applications, Ser. No. 07/739,498 and Ser. No. 07/739,464.

BACKGROUND OF THE INVENTION

1. Field of the Invention

This invention pertains to pitch control systems for helicopter rotors that produce aerodynamic thrust of variable magnitude in accordance with the angular relation of rotor blades to an airstream in which the rotor turns. The invention relates particularly to increasing the service life of rod end bearings that operate to transmit pitch control force to the pitch shafts supported on a rotor hub.

2. Description of the Prior Art

Helicopter rotor hubs are connected driveably to a rotor shaft and the hub-rotor shaft assembly is mounted for rotation about the axis of the rotor shaft. The rotor hub includes several rotor arms, one supporting each rotor blade, each rotor arm angularly spaced about the rotor axis and extending radially along a pitch axis from the rotor axis. Each rotor arm supports a pitch shaft concentrically with the associated pitch axis, about which the corresponding blade moves in accordance with pitch control forces transmitted from a control system.

Each pitch shaft is connected, at a position offset from the pitch axis, to a pitch link or pitch control rod attached to a rotating, axially moveable drive scissors, which moves along the rotor axis in response to actuation by the pitch control system. Connection of the pitch links to the drive scissors and pitch shafts is made by universal joints in the form of rod end bearings carried at opposite ends of each pitch link.

Each pitch arm and pitch shaft is inclined with respect to a plane perpendicular to the rotor shaft; therefore, the end of each pitch link connected to the drive scissors moves along the rotor axis but the other end moves about the inclined pitch axis.

The universal joints accommodate the motion at each end of the pitch links about different axes as the pitch links transmit force from the control system to the pitch shafts by rotating on a spherical surface integral with each rod end bearing.

Centrifugal forces, developed by rotation of the rotor, continually produce contact forces among the components of the rod end bearings. These forces operate to reduce the service life of the rod end bearings on the pitch links because they increase the magnitude of forces on the bearings during operation as pitch control force is transmitted from the drive scissors to the pitch shafts.

SUMMARY OF THE INVENTION

It is an object of the present invention to overcome problems in the prior art caused by kinematic foreshortening and associated with the adverse effect on the service life of rod end bearings that transmit to the pitch shafts forces that change blade pitch. These problems relate to kinematic foreshortening of a flexure resulting from inclination of the rotor pitch shafts with respect to a plane perpendicular to the rotor axis.

It is another object of this invention to increase the service life of the rod end bearings by preloading the bearings with a force substantially equal and oppositely directed to a bearing force resulting from operation in a centrifugal force field.

It is still another object of this invention to eliminate conventional pitch links having two rod end bearings, one at each end of each pitch link, which transmit axial displacement of a rotating control ring and convert that axial displacement to pitch displacement of the blades supported on each pitch shaft. Instead, in the rotor of this invention, a unique assembly including a pitch beam and flexure extending from the pitch beam to each pitch shaft converts axial movement to pitch displacement.

A helicopter rotor to which this invention may be applied includes a pitch beam rotating adjacent a rotor hub, and flexures connecting the pitch beam to each pitch shaft. Each flexure bearing is located in a rod end comprising a lug formed integrally with the flexure, a spherical bearing housing fitted within the lug, and a spherical bearing.

Centrifugal force on the flexure bearing, flexure and pitch arm has potential to produce force between the bearing and bearing housing in addition to the force between these flexure bearing components resulting from kinematic foreshortening. Presence of these forces on components of the flexure bearing has an adverse effect on life of the bearing.

In order to compensate for these forces and their effect of shortening service life of the flexure bearing, each flexure is deflected during installation to produce a load on the flexure bearing that is equal in magnitude and opposite in direction to the load developed on the flexure bearing due to its operation in the force field. The flexure is preloaded during installation by fixing one end of the flexure to the pitch beam and bending the flexure so that the flexure bearing is displaced in a radially inward direction relative to its free position. Thereafter, when the rotor turns and the force field develops, the effect of forces urging components of the flexure bearing into mutual contact is reduced due to relief of the preload developed among components of the flexure bearing during installation of the flexure and attachment of the flexure bearing to the pitch arm.

DESCRIPTION OF THE PREFERRED EMBODIMENT

Figure 2:
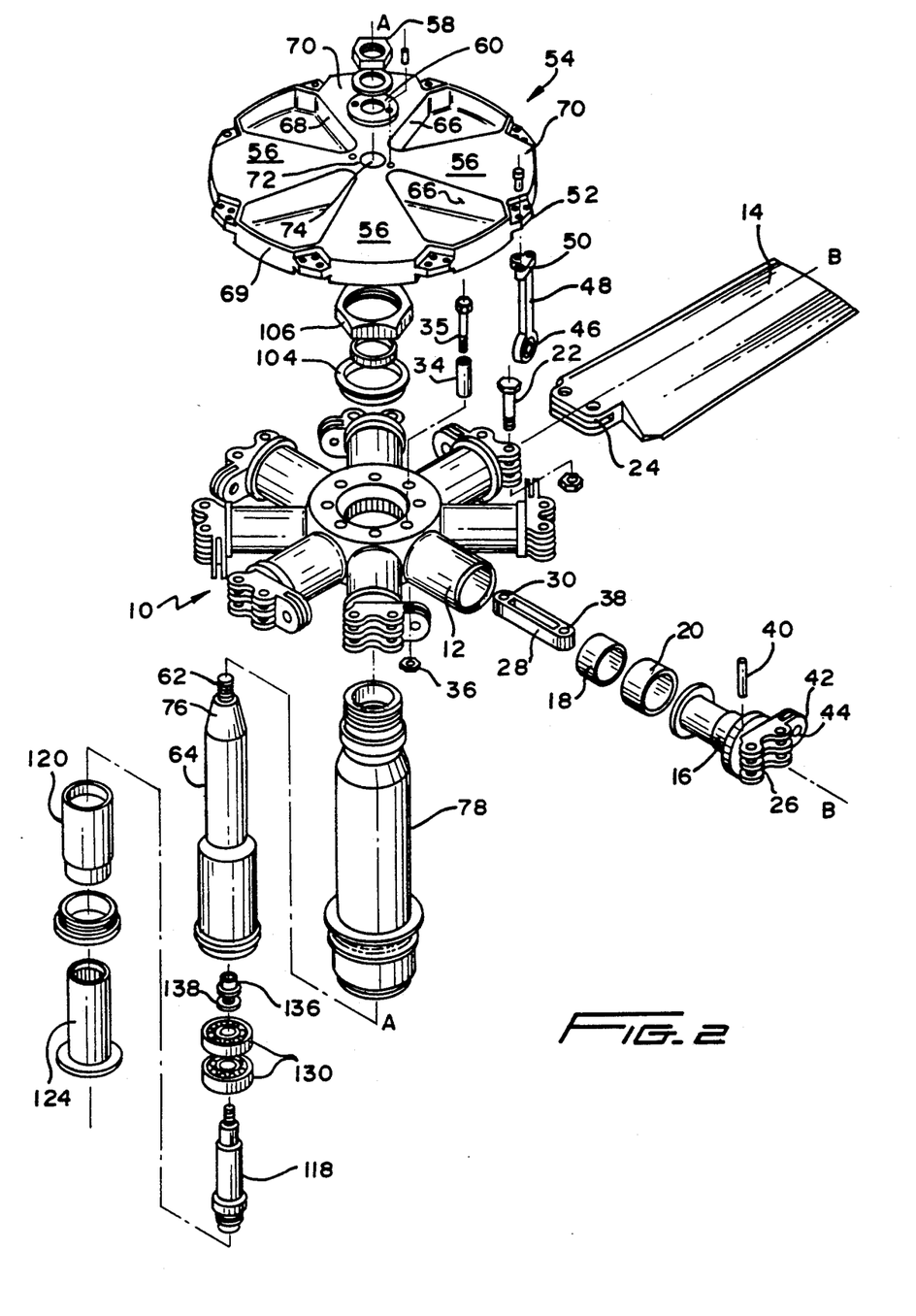
FIG. 2 is an isometric view of a rotor hub, rotor blade, and pitch controls for a rotor assembly. The components are shown spaced apart mutually to emphasize the order of assembly and the nature of attachment among the components.

Referring first to the schematic diagram of FIG. 2, the assembly includes a rotor hub 10 having eight angularly spaced rotor arms 12 extending outward from the axis and inclined approximately two degrees with respect to a plane perpendicular to rotor axis A—A. Consequently the pitch axis B of each rotor arm is inclined to form a shallow conic angle with the rotor axis. Each rotor blade 14 is supported on a rotor arm extending radially from the rotor hub.

Each rotor hub arm rotatably supports a pitch shaft 16 for pitch displacement about axis B on inboard and outboard dry bearings 18, 20 located between the inner surface of the rotor hub arm and the outer surface of the pitch shaft. A rotor blade is attached to each pitch shaft by blade retention bolts 22, which pass through lugs 24 located at the inner end of the blades and lugs 26 extending toward the blade end from the outer end of the pitch shaft.

One tie bar 28 is located within each rotor hub arm and includes inner lugs 30 connected to the rotor hub by an inboard tie bar pin 34 fastened in place by a bolt 35 and a nut 36, and outboard lugs 38 connected to the pitch shaft by an outboard tie bar pin 40. The tie bars are made from thin steel wire having a diameter of approximately 0.030 inch. wound repeatedly around pins 34 and 40 to form an elongated spool, encased in urethane or epoxy, encircling the pins. A suitable tie bar assembly is available from Lord Corporation, Erie, Pa.

The tie bar 28 provides axial force and torsional continuity between the hub 10 and pitch shaft 16, yet the tie bar readily permits torsional displacement between the hub and pitch shaft because torsional stiffness of a spool or bundle of wire in this form is inherently low.

Each pitch shaft 16 includes a lug 42 located adjacent the leading edge of the rotor blade and having an attachment hole 44 offset a short distance from the pitch axis B and suited for mechanical attachment by a bolt to a universal joint 46 in the form of a spherical bearing or rod end carried at the end of a flexure 48. The universal joint offers little or no resistance to bending moment carried by the flexure. Instead, the universal joint transmits, between the flexure and the pitch shaft, only force, principally force in a direction tending to move the pitch shaft about its pitch axis as a pitch beam 54 is raised and lowered by operation of control shaft 64.

Each flexure 48 has a relatively thin web extending from the spherical bearing 46 to the pitch beam 54. The flexure web is relatively inflexible in bending through its width, i.e. in the direction of rotation about the rotor axis, and is relatively flexible in bending through its thickness, i.e. in the radial direction. Preferably the flexure 48 and pitch beam are of forged or injection molded titanium, or aluminum, or another suitable metal. Alternatively, the pitch beam may be of epoxy resin reinforced by graphite fibers.

The upper end of each flexure, the end opposite the location of the universal joint, is formed with a thick flange 50 connected by multiple bolted attachments to a corresponding mounting flange 52, supported on pitch beam 54.

The pitch beam 54 includes four arms 56 extending radially from the rotor axis. The pitch beam 54 and rotating control shaft 64 are connected mutually for rotation about axis A—A and displacement along that axis by a taper-lock and key arrangement 128 located at the outboard end of control shaft 64 and secured by pitch beam nut 58 and washer 60. Located at the radial periphery of the pitch beam arms 56, at the leading and trailing sides of the arms where flanges 66, 68 terminate at ring 69, are the eight mounting flanges 52, one for each rotor arm, blade and flexure. Each mounting flange 52 is located at the outboard end of a radially directed web 70 extending outward from the rotor center and connecting the flanges at angularly spaced locations about the rotor axis. The pitch beam arms 56 are joined at a central hub 72 formed with a tapered hole 74 which receives the mating tapered surface 76 at the end of the rotating control shaft 64. The key arrangement 128 fixes the pitch beam 54 and rotating control shaft 64 against relative rotation.

Figure 4A:
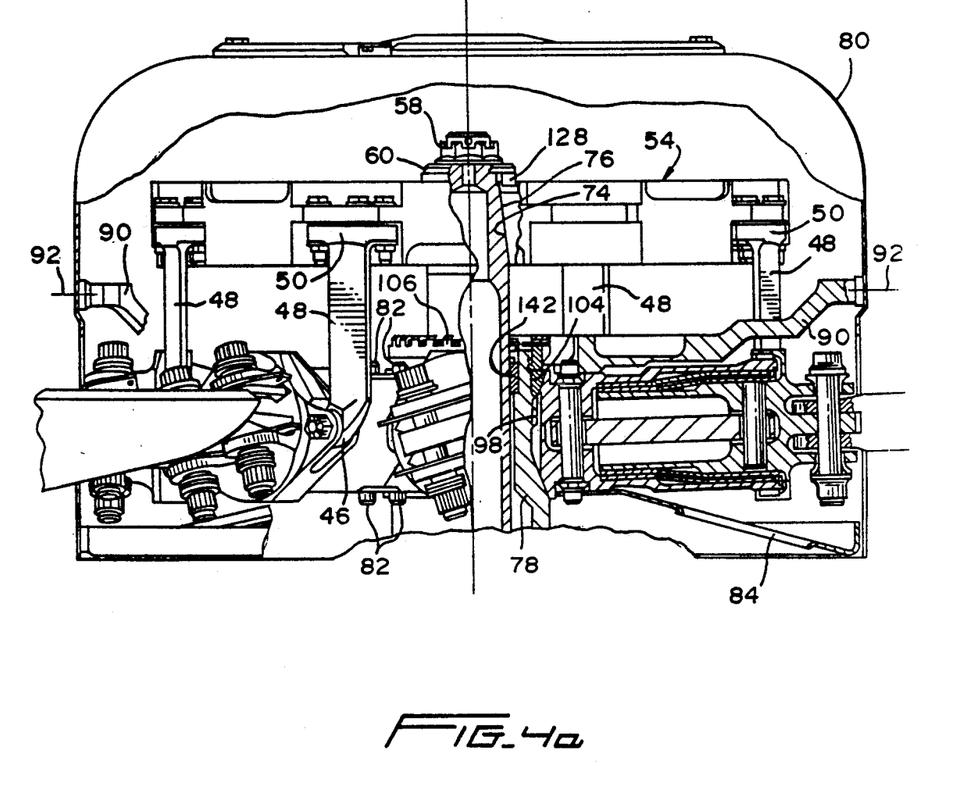
FIGS. 4A and 4B in combination are a cross section through a diametric plane of a rotor hub, upper pitch controls, lower rotor controls and pitch actuation system.
Figure 4B:
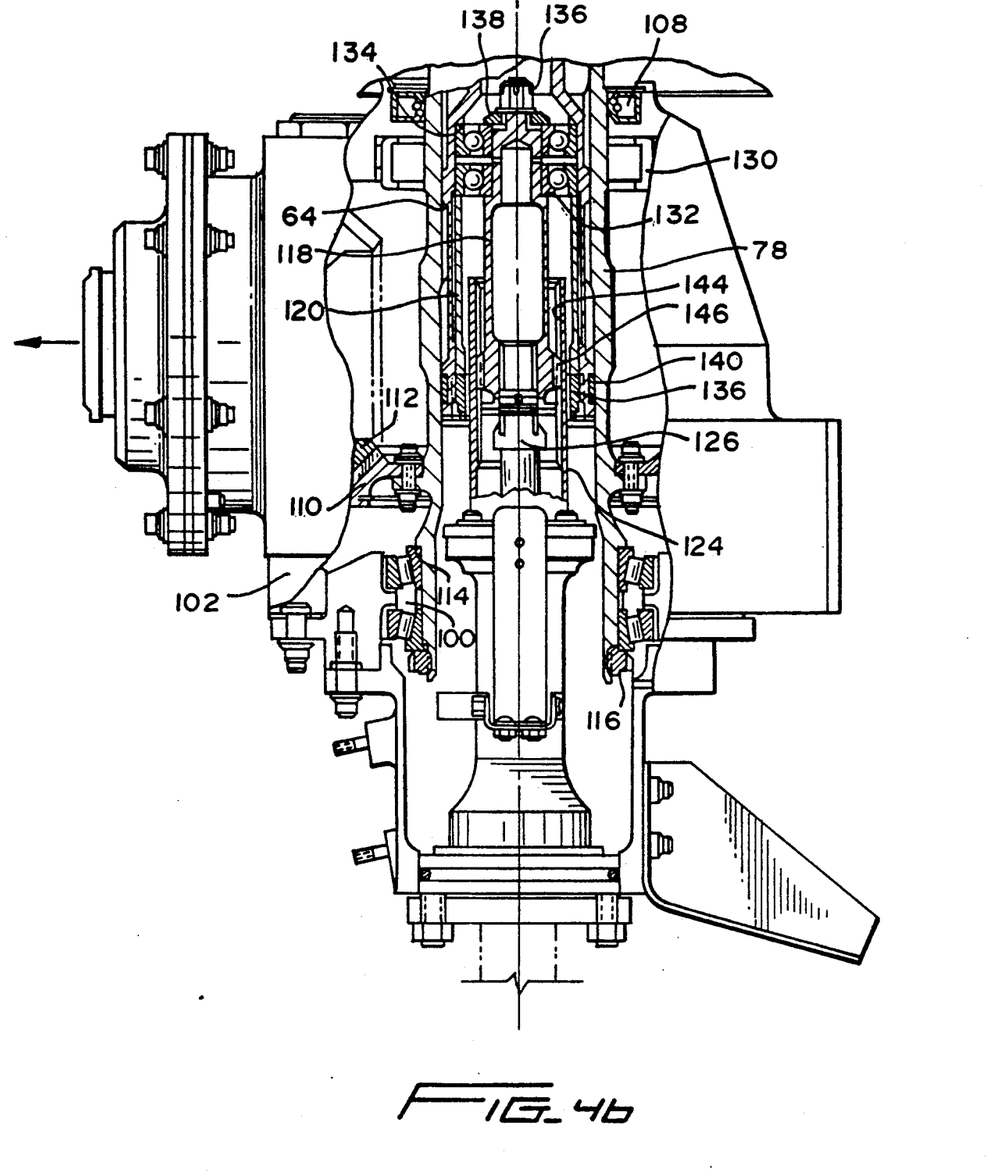

Details of the upper and lower controls and pitch actuation system are illustrated in FIGS. 4A and 4B. Rotor shaft 78 is driveably connected to the rotor hub 10 by a spline 98 and is supported rotatably by tandem roller thrust bearings 100 carried on a gearbox housing 102. The rotor shaft 78 is driveably connected through a driveshaft to an engine shaft. A tapered ring 104, located between a conical surface formed on the central opening of the rotor hub and the outer surface of the rotor shaft, is fitted in position by the engagement of a castellated nut 106 contacting the tapered ring 104 and screw threads on the outboard end of the rotor shaft. A dynamic seal 108, located on the gearbox, contacts the outer surface of the rotor shaft to prevent passage of dirt, hydraulic fluid or contaminants. A bevel gear 110, bolted to the rotor shaft, meshes with a bevel gear 112, located within the gearbox and supported rotatably on a shaft driven by an engine. The position of the tandem bearing with respect to the gearbox and rotor shaft is determined by forcing the bearing into contact with a shoulder 114 on the rotor shaft as a terminal nut 116 engages screw threads at the end of the shaft.

Located within the bore of rotor shaft 78 are rotating control shaft 64, a stationary, nonrotating control shaft 118, a bearing block tube 120, a shaft guide 124, and a push-pull actuator 126. The rotating control shaft 64 is supported rotatably with respect to the stationary control shaft 118 by the tandem ball bearings 130 located between a shoulder 132 on control shaft 118 and a shoulder 134 on control shaft 64.

The outer races of the ball bearings are held in contact with shoulder 134 by the end of the bearing lock tube, which is held against the outer races by engagement between a bearing lock nut 136 and screw threads on the inner surface of the rotating control shaft 64.

The inner races of the ball bearings are held in contact with shoulder 132 by a bearing lock nut 136 ana washer 138, which are held against the inner races by engagement of nut 136 with screw threads on the outboard end of the stationary control shaft. A bearing 140 rotatably supports control shaft 64 with respect to the rotor shaft 78 at the inboard end of the rotor shaft; bearing 142 supports control shaft 64 on the rotor shaft 78 at the outboard end of the rotor shaft.

The shaft guide 124, mechanically fixed at its lower or inboard end against rotation and displacement, includes an axially directed spline 144 formed on its inner surface and extending along the length of the guide. The shaft guide spline is engaged with a shorter spline 146 formed on the outer surface of control shaft 118. The meshing splines prevent rotation of the stationary control shaft 118 and guide its axial displacement within the shaft guide as actuator 126 extends and retracts in accordance with need for changes in rotor thrust. Actuator 126 is a hydraulic cylinder having a piston or arm connected to control shaft guide 124 for extension and retraction as the cylinder is pressurized and vented.

The eight angularly spaced flexures 48 connect, for rotation about the rotor axis A—A, the pitch beam 54 and rotor hub 10 through connections to the pitch shaft lugs 42 and to the mounting flanges 52.

In operation, actuator 126 extends and retracts in response to pilot control or automatic control intended to alter rotor thrust. When the actuator raises control shaft 118, that shaft moves axially guided by the shaft guide splines. Contact between the races of bearings 130 and the shoulders of control shafts 78 and 118 causes the rotating control shaft 64 and pitch beam 54 to rise as a unit relative to the rotor hub and blades. This action displaces lugs 42 of the pitch shafts upward, causes the pitch shafts to pivot about the pitch axes, increases pitch of the rotor blades, and increases thrust produced by the tail rotor.

Torque from the engine is delivered to the rotor shaft at the meshing bevel gears 110, 112. The rotor hub, pitch shafts and blades are driven from the rotor shaft through spline connection 98. The flexures 48 are driven rotatably about the rotor axis due to connections at the pitch shafts where the universal joints 46 are located. The flexures drive the pitch beam rotatably about the rotor axis through the bolted attachments 52 located at the ends of each flexure. The flexures are relatively stiff in the direction circumferential to the rotor axis and relatively flexible in the direction normal to the rotor axis, the radial direction.

Figure 1:
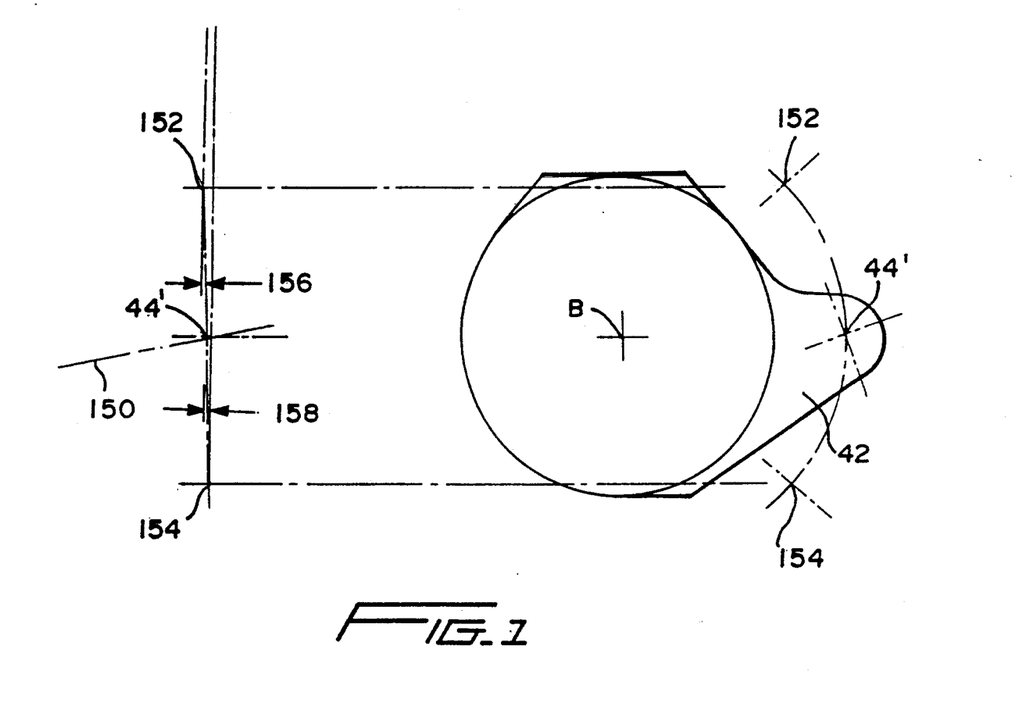
FIG. 1 is a schematic diagram showing the angular relation among the axis of rotation, the pitch axis, and a plane perpendicular to the rotor axis when viewing these along a radius of the rotor. The figure includes an end view of a pitch shaft looking radially from the pitch shaft toward the rotor center.
Figure 3:
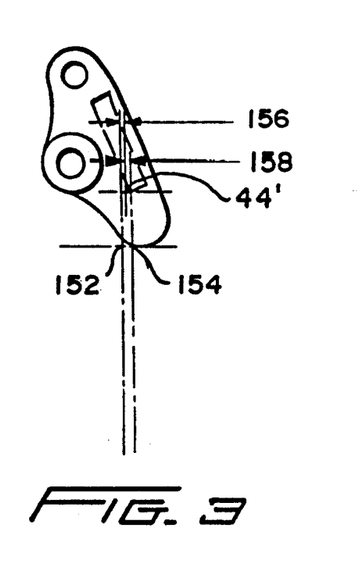
FIG. 3 is a schematic diagram of a flexure viewed from above the pitch shaft.

FIG. 1 is a schematic diagram viewed from the side along a pitch axis showing the angular relation among the rotor axis, the pitch axis and a horizontal plane 150 perpendicular to the rotor axis. The figure includes at its right-hand side an end view of a pitch shaft looking radially inward toward the rotor center showing the extremities of the range of pitch movement. FIGS. 1 and 3 in combination show a foreshortening effect due to inclination of pitch axis B with respect to plane 150.

FIG. 1 shows the angular range of movement of a pitch shaft 16 about its pitch axis that results as the pitch beam is extended and retracted. The center of the attachment hole 44 through each pitch shaft lug 42 rotates about the pitch shaft approximately forty degrees counterclockwise as the pitch beam is raised and approximately forty degrees clockwise as the pitch beam is lowered from a reference position, the rig position. When the rotor is set at the rig position, the mean chordal plane of each rotor blade is inclined about fifteen degrees with respect to a plane containing the corresponding pitch axis and the rotor center.

The center of the universal joint 46 carried on each flexure 48 is aligned with the center of the attachment hole 44. However, the pitch beam 54 and the end of the flexure attached to the pitch beam move axially along the rotor axis A—A, but the universal joint 46 is constrained to pivot about the pitch axis, which is not perpendicular to the rotor axis but is inclined about two degrees with respect to plane 150. This inclination induces radial displacement of the flexure bearing as the pitch shaft moves.

When the pitch beam 54 is raised to its maximum extent, point 44' rotates to point 152 and moves radially inward a distance 156 from its radial position when in the rig position at 44'. When the pitch beam is lowered to its maximum extent, point 44' rotates to point 154 and moves radially outward a distance 158 from its radial position when in the rig position. When the clockwise and counterclockwise movement of the pitch shaft is equal, distances 156 and 158 are equal. In the example illustrated, the distance from the pitch axis to the center of the flexure bearing is about 1.55 inches, distances 156 and 158 are equal to 0.054 inch. This distance is associated with kinematic foreshortening of the flexure. FIG. 3 is a view from above that of FIG. 1 showing the potential range of radial movement of the flexure bearing due to movement of the pitch shafts about the corresponding pitch axis and inclination of the pitch axis.

Figure 6:
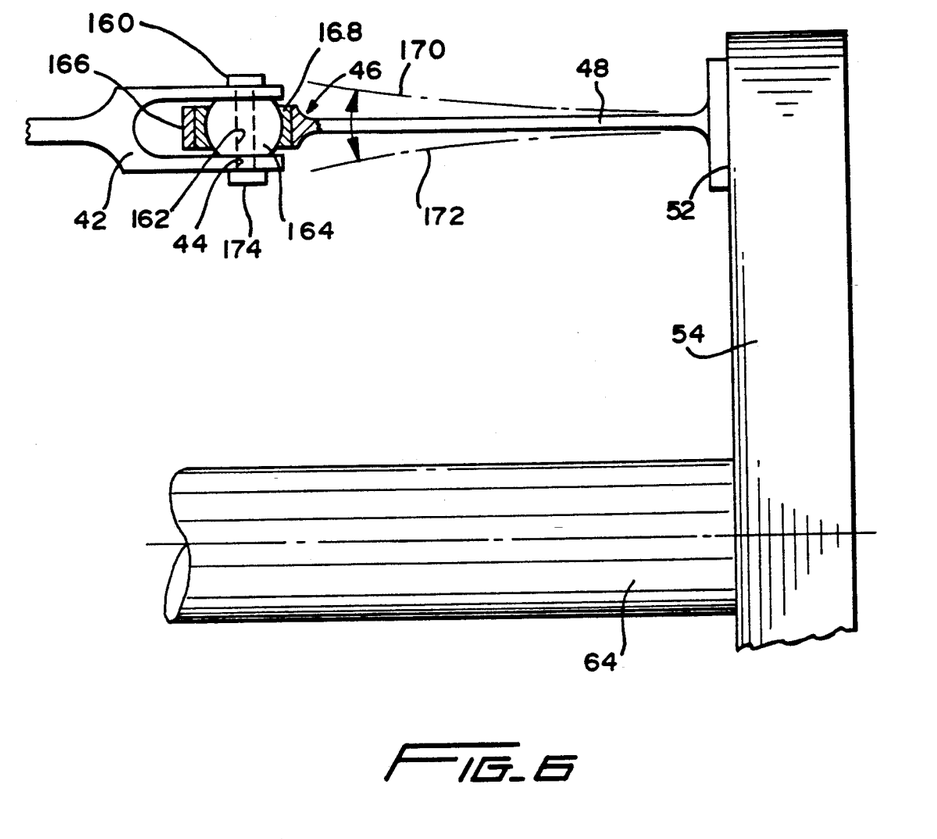
FIG. 6 is a schematic diagram partially in cross section through a flexure bearing and pitch arm.

As FIG. 6 shows, each flexure bearing 46 is located in a rod end comprising a lug 166, formed integrally with the flexure; a spherical bearing housing 168, fitted within lug 166; and spherical bearing 164. Potential radial displacement of the flexure bearing due to movement of the pitch shaft about its corresponding pitch axis is indicated by phantom lines 170, 172. When the pitch beam and flexure are raised, the flexure bearing, if unrestrained, would move radially outward as indicated by line 170. When the pitch beam and flexure are lowered, the flexure bearing, if unrestrained, would move radially inward as indicated by line 172. Contact between the face of bearing 164 and the inner surface of the lugs 42 restrains these potential displacements of the flexure bearing, but this restraint produces a radially directed load between bearing 164 and bearing housing 168.

Centrifugal force on the flexure bearing, flexure and pitch arm has potential to produce force between bearing 164 and bearing housing 168 in addition to the force between these flexure bearing components resulting from kinematic foreshortening. The flexures, pitch shafts and pitch beam operate in a centrifugal force field produced by their rotation about the rotor center. Due to this force field, radially outwardly directed forces due to the weight and radial position in the force field developed on the bearing housing 168 and adjacent portion of the flexure are transferred to spherical bearing 164. These loads are reacted by contact between the spherical bearing and lugs 42. This reaction produces an additional radially directed load between bearing 164 and bearing housing 168. Presence of these forces on components of the flexure bearing has an adverse effect on life of the bearing.

Figure 5:
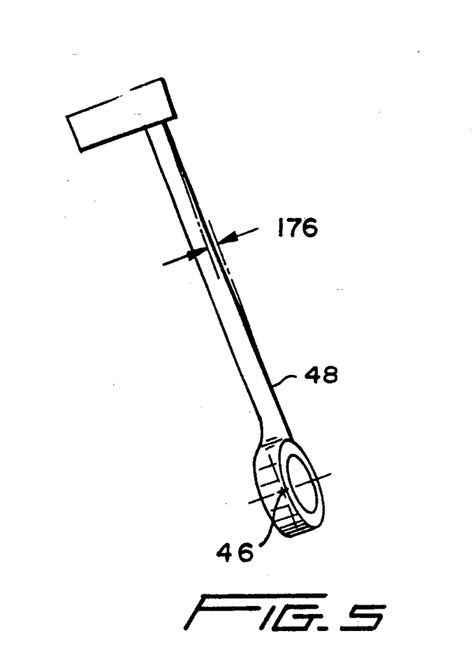
FIG. 5 is a side view of FIG. 3 showing the structural displacement developed during installation of the flexure that causes preload of the flexure bearing.

In order to compensate for these forces and their effect on shortening service life of the flexure bearing, each flexure is deflected during installation to produce a load on the flexure bearing 46 that is equal in magnitude and opposite in direction to the load developed on the flexure bearing due to its operation in the force field. The flexure is preloaded during installation by fixing one end of the flexure to the pitch beam and bending the flexure 48 so that the flexure bearing is displaced by about 0.074 inches in a radially inward direction relative to its free position. FIG. 5 shows the preload deflection 176. When so deflected, each flexure bearing is located between the lugs 42 of the pitch arm, attachment bolt 160 is inserted through the lug holes 44 and hole 162 through the spherical bearing 164, and nut 174 is drawn up on the bolt. This preload causes a force to be developed between the bearing 164 and bearing housing 168 tending to force bearing 164 outward with respect to the housing. Thereafter, when the rotor turns and the force field develops, the effect of forces urging components of the flexure bearing into mutual contact is reduced due to relief of the preload developed among components of the flexure bearing during installation of the flexure and attachment of the flexure bearing to the pitch arm.

Numerous modifications and variations will occur to those skilled in the art. The invention shall not be limited to the exact construction and operation illustrated and described here; instead, it is intended that the claims cover all features, advantages and equivalents of the invention that fall within the true spirit and scope of the claims.

I claim:

1. In a helicopter rotor defining a rotor axis and supporting a plurality of rotor blades each adapted for variable pitch, a device for compensating for the presence of centrifugal force on components of the rotor, comprising:

a plurality of pitch shafts angularly spaced about the rotor axis, each pitch shaft defining a pitch axis and extending radially outwardly from the rotor axis along the pitch axis, each pitch shaft being mounted for movement about its respective pitch axis, and having an attachment offset laterally from its respective pitch axis and radially from the rotor axis;

a pitch beam mounted for rotation about the rotor axis and displacement along said rotor axis; and a plurality of flexure means, each flexure means comprising a first end rigidly connected to the pitch beam, a universal joint supported at a second end, connected to an attachment of a respective pitch shaft, the radial location of each universal joint relative to said rotor axis being displaced a predetermined radial distance to effect connection to the attachment of a respective pitch shaft from its location before connection to the attachment of the respective pitch shaft, for changing the angular position of each pitch shaft about the respective pitch axis in response to axial displacement of the pitch beam.

2. The device of claim 1 wherein each attachment comprises:

lugs formed on the pitch shafts extending laterally from the pitch axis, each lug defining an attachment hole therethrough, the lugs being grouped in pairs, the lugs of each pair being mutually spaced to receive a universal joint therebetween;

bolts, each located in the attachment hole of a lug pair, connecting each universal joint to the respective lug pair.

3. The device of claim 1 wherein each attachment comprises:

lugs formed on the pitch shafts extending laterally from the pitch axis, each lug defining an attachment hole therethrough, the lugs being grouped in pairs, the lugs of each pair being mutually spaced to receive a universal joint therebetween; and wherein each flexure means further comprises:

a lug located at the second end of each flexure means, having a hole through the lug;

a spherical bearing housing located in the lug hole;

a spherical bearing located within the spherical bearing housing, having an attachment hole therethrough aligned with the hole in the lugs, adapted to receive a connector therein for connecting the flexure means to the pitch shaft.

4. The device of claim 1, wherein each rotor blade is connected to a respective pitch shaft at the radially outer end of the pitch shaft, and extends radially along the respective pitch axis, the pitch of the blades changing as the respective pitch shaft moves about the respective pitch axis.

5. The device of claim 1 wherein each flexure means further comprises:

flexures mutually spaced angularly about the rotor axis, each extending from the pitch beam toward a respective pitch shaft, each aligned with the attachment of a respective pitch shaft, and each having a web connecting the first end and second end, said web being relatively stiff in bending in a direction substantially tangential with respect to the rotor axis and relatively flexible in bending in a direction substantially radial with respect to the rotor axis.

6. The device of claim 1 wherein each flexure means further comprises struts angularly spaced mutually about the rotor axis, each strut comprising:

a web extending between the pitch beam and a respective pitch shaft, said web having relatively high bending stiffness in a direction substantially tangential with respect to the rotor axis and a relatively low bending stiffness in a substantially radial direction with respect to the rotor axis;

a mounting flange located at one end of the web and connected rigidly to the pitch beam;

a spherical rod end bearing forming said universal joint located at the other end of the web opposite to said one end.

7. In a helicopter rotor defining a rotor axis and adapted to support a plurality of rotor blades that each produce variable lift, a device for compensating for the effect of kinematic foreshortening on components of a system for changing pitch of the rotor blades about a pitch axis, comprising:

a plurality of pitch shafts angularly spaced about the rotor axis, each pitch shaft defining a pitch axis extending radially outwardly from the rotor axis along the pitch axis that is inclined with respect to a plane perpendicular to the rotor axis, each pitch shaft being supported for movement about the respective pitch axis, and having an attachment offset laterally from its respective pitch axis;

a pitch beam mounted for rotation about the rotor axis and displacement along said rotor axis; and a plurality of flexure means, each flexure means comprising a first end rigidly connected to the pitch beam, a universal joint supported at a second end, connected to an attachment of a respective pitch shaft, the radial location of each universal joint relative to said rotor axis being displaced a predetermined radial distance to effect connection to the attachment of a respective pitch shaft from its location before connection to the attachment of the respective pitch shaft, for changing the angular position of each pitch shaft about the respective pitch axis in response to axial displacement of the pitch beam.

8. The device of claim 7 wherein each flexure means further comprises:

flexures mutually spaced angularly about the rotor axis, each extending from the pitch beam toward a respective pitch shaft, each aligned with the attachment of a respective pitch shaft, and each having a web connecting the first end and second end, said web being relatively stiff in bending in a direction substantially tangential with respect to the rotor axis and relatively flexible in bending in a direction substantially radial with respect to the rotor axis.

9. The device of claim 7 wherein each flexure means further comprises struts angularly spaced mutually about the rotor axis, each strut comprising:
- a web extending between the pitch beam and a respective pitch shaft, said web having relatively high bending stiffness in a direction substantially tangential with respect to the rotor axis and a relatively low bending stiffness in a substantially radial direction with respect to the rotor axis;
- a mounting flange located at one end of the web and connected rigidly to the pitch beam;
- a spherical rod end bearing forming said universal joint located at the other end of the web opposite to said one end.

10. In a helicopter rotor defining a rotor axis and including a plurality of pitch shafts angularly spaced about the rotor axis, each pitch shaft extending radially outwardly from the rotor axis along the pitch axis, being supported for movement about the respective pitch axis, and having an attachment offset laterally from said pitch axis; a pitch beam mounted for rotation about the rotor axis and displacement along said rotor axis; and flexures, each having a first end and a second end, the second end supporting a universal joint, a method for installing components of a system for changing the angular position of each pitch shaft about the respective pitch axis, comprising the steps of:
- connecting rigidly the first end of each flexure to the pitch beam;
- bending each flexure, thereby displacing its universal joint a predetermined distance with respect to its position in a free condition when it is not connected; and
- fixing the position of each universal joint while the respective flexure is so displaced by connecting each universal joint to the attachment of the respective pitch shaft.

11. The method of claim 10 further comprising:
- bending each flexure radially, thereby displacing each universal joint a predetermined radial distance toward the rotor axis with respect to its position in the free condition.

* * * * *